Figure 1:
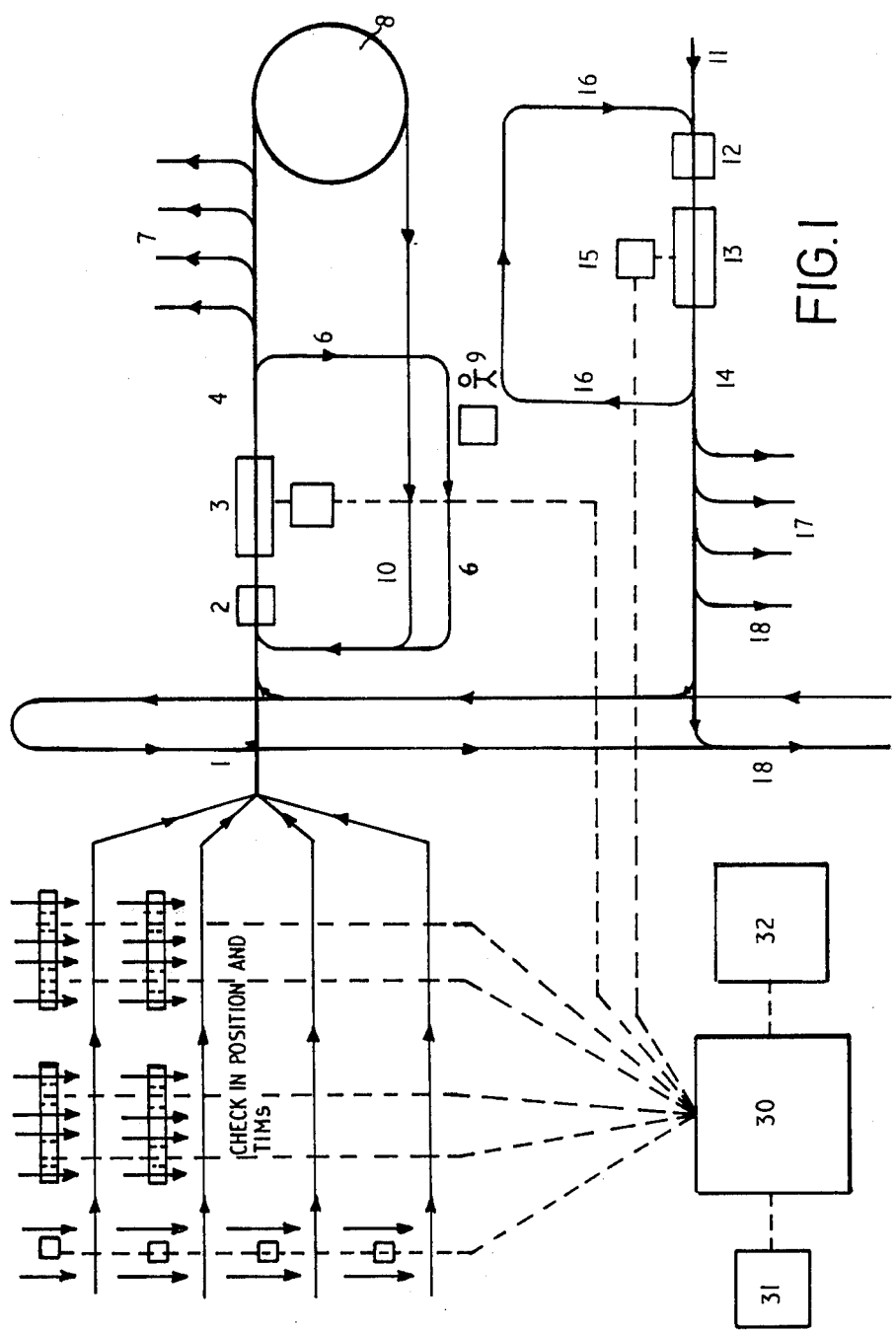

United States Patent [19]

Vaughan et al.

[11] 4,058,217

[45] Nov. 15, 1977

[54] AUTOMATIC ARTICLE SORTING SYSTEM

[75] Inventors: Richard Vaughan, Maroubra; Peter Harold Cole, Wahroonga, both of Australia

[73] Assignee: Unisearch Limited, Kensington, Australia

[21] Appl. No.: 639,466

[22] Filed: Dec. 10, 1975

Related U.S. Application Data

[63] Continuation of Ser. No. 465,512, April 30, 1974, abandoned.

[30] Foreign Application Priority Data

May 1, 1973 Australia ............................... 3145/73
Aug. 30, 1973 Australia ............................... 4676/73

[51] Int. Cl.² ............................................... B07C 3/10
[52] U.S. Cl. .......................... 209/74 M; 209/111.7 R; 209/DIG. 1; 214/11 R
[58] Field of Search ............. 209/73, 74, 111.5, 111.6, 209/111.7 R, 111.8, DIG. 1; 198/38, DIG. 16; 214/11 R; 221/73

[56] References Cited

U.S. PATENT DOCUMENTS

| 3,610,159 | 10/1971 | Fickenscher | 198/38 X |
| 3,648,838 | 3/1972 | Hiromura | 209/74 M |
| 3,650,876 | 3/1972 | Stageberg | 221/73 X |
| 3,738,475 | 6/1973 | Lee et al. | 198/38 |
| 3,803,556 | 4/1974 | Duffy | 198/38 X |

Primary Examiner—Robert B. Reeves
Assistant Examiner—Joseph J. Rolla
Attorney, Agent, or Firm—Toren, McGeady and Stanger

[57] ABSTRACT

The invention consists of a method and apparatus for article sorting wherein an electronically interrogatable label is provided for and attached to each article, the label bearing indicia indicative of a serial number, instructions relating to the routing of the label bearing those indicia being fed into a suitable computing system arranged to control the operation of sorting devices on receipt of a signal from a reader arranged to interrogate the label. The term "label" is intended to include any device such as, for example, a tag, capable of carrying the necessary indicia and of being attached to an article to be sorted.

12 Claims, 2 Drawing Figures

AUTOMATIC ARTICLE SORTING SYSTEM

This is a continuation of application Ser. No. 465,512 which was filed Apr. 30, 1974 now abandoned.

With the ever increasing cost of manual labour, there has arisen an increasing need in many applications for means by which various articles can be automatically identified by machine. Such applications include by way of example, but are not limited to, systems for the automatic reading of airline baggage routing information labels for the automatic sorting and despatch of airline baggage. A second example is in systems for the automatic sorting of postal articles such as parcels through the various sorting centres in a postal distributions system.

The identification information determining the sorting action to be taken in regard to an article may be extensive. For example for airline baggage a four section interline transfer tag may require up to twenty four alpha characters plus sixteen digits. Likewise address information for a postal article may require thirty alpha characters plus ten decimal digits including post code. In both cases this is an enormous information content, requiring more than 160 bits for a straight binary code.

The technology and systems used for airline baggage handling and identification have for some time been under critical study by the airlines themselves, a detailed survey of the principal problems and an outline of broad approaches to their solution having been made by consultants commissioned by the joint ATC/IATA Computer Ticketing and Automated Passenger Processing Co-Ordinating Committee. The primary objective of such studies has been identified as the definition of procedures which will result in lower handling costs, greater speed and reliability in the processing of baggage, and reduced burdens on passengers, both in physical handling and queuing. A general conclusion which emerges from such studies is that a high decree of automation of the baggage identification and handling operation is necessary to the attainment of those objectives, and that the one most difficult aspect to bring under automatic control is the extraction to appropriate destination information from baggage labels.

The present invention relates to a system of automatic article label identification which can form the basis of a fully automated article sorting and handling operation and in a particular application an airline baggage sorting system capable of realizing all of the above objectives. The system will be shown as well to be capable, in preferred form of providing significant additional benefits not listed above, such as more claim area operations and expansion of services to passengers in some areas.

In the following a system according to the present invention intended for handling baggage will for brevity be referred to as the "Unisearch" system.

Any automatic airline baggage sorting system intended for industry-wide application must necessarily be implemented in stages during which it must retain complete compatibility with existing manually-sorted stations. The Unisearch system satisfies the above requirement in all respects. Deplaned baggage from stations outside the system is routed for separate manual sorting. Operation of the Unisearch system within any station is entirely flexible; all types of baggage can be controlled including 1. Baggage checked at ticketing or baggage counters by airline personnel.
2. Baggage checked by passengers themselves, including remote parking lot or curb side check-in points, even if the passenger does not know or has not decided the details of his itinerary at the time of baggage check-in.
3. Deplaned baggage originating from other stations within a group operating on the Unisearch system.
4. Deplaned baggage as in (3) above for online or inter-transfer to on-going flights. A maximum of 8 successive transfers can be made.
5. Both originating and deplaned transfer bags which may be initially routed to holding stacks and subsequently reprocessed nearer to flight time.

In a form previously proposed, interline baggage tags may easily have up to four sections, each section carrying up to six alpha characters plus four decimal digits. This is an enormous information content, requiring a minimum of $\log_2(24^6 \times 10^4)^4) - 164$ bits for a straight binary code increasing to $4 \times (6\times8+4\times4) = 256$ bits for a EBCDIC/BCD code. Indeed at the present rate of $419 \times 10^6$ enplaned bags per annum, $2^{164} = 2.34 \times 10^{49}$ is sufficient to uniquely identify every bag carried by all ATC/IATA airlines for $2.34 \times 10^{44}/419 \times 10^6 = 5.6 \times 10^{40}$ years.

The Unisearch system retains a printed tag format for purposes of possible emergency manual sorting. It eliminates however the need for such machine-readable code capacity by instead coding each tag with a machine readable fixed serial number by which it can be followed through the airline system under computer control. The serial number acts simply as a pointer to more intensive routing data or even other information stored in computer memory. Hitherto, electronic tags have been completely economically unfeasible. The Unisearch system however replaces the large, programmable and throw-away memory which other approaches have attempted to place on every bag by a low-cost fixed-coded tag supplemented by reuseable computer storage. Finally as a by-product, the present invention solves the very difficult problem of encoding variable machine readable information at the point of tag issue.

The cost of the machine-readable tag which must be attached to every article for automatic identification and writing is directly proportional to the amount of information this tag is required to encode. In many applications, the required tag information capacity can be reduced very substantially below that for identification information encoding, for example, the 164 bits referred to above, by means of the serial number concept with which the present invention is concerned. As is pointed out above the need for such large machine readable identification information code capacity could be eliminated by instead coding each tag with a machine readable fixed serial number by which it can be followed through, for example, an airline system under computer control.

In some cases the preferred form of the serial number system is that in which every article carries a unique serial number. For example, for an airline baggage sorting system such as that described in detail below this is arranged by allocating every airport station its own unique set of serial numbers which are continuously reissued on a cycle time which is greater than the time that any tagged piece of airline baggage will remain in the airline system. Thus at any one point of time, any one serial number can only be attached to one baggage article still being within the airline system. This article is thus iniquely identifiable. Except for the obvious exception of equipment failure, manual sorting of such an uniquely identified article is never required at any time during its passage through the system.

The present invention may also be applied in systems in which, in order to further reduce tag serial number code length, all articles are not required to carry unigue serial numbers, and occasional ambiguities arising from chance coincidence of serial numbers, are accepted. An example of this is in the sorting of postal parcels. The penalty for such shorter code lengths is the cost of manual sorting capability which must be maintained on hand to resolve the occasional ambiguities referred to above.

The question of which form of the serial number is preferred in any application is determined by the code capability of the kind of machine-readable tag used, by considerations of the cost trade-off between increased code length and the cost of manual resolution of ambiguities, and by considerations of speed, reliability, freedom from operator error, etc.

Certain forms of machine readable tags have a limited code capacity, for example, tags coded by printing with a combination of different fluorescent inks as described by Arthur D. Little Inc. in "Study of Airline Baggage Identification and Handling" report of Project Team 4, Automated Passenger and Baggage Processing, joint ATC/IATA Computer Ticketing and Automated Passenger Processing Co-ordinating Committee, July, 1971. Many other kinds of limited code capacity tags having code capacity of ten binary bits or less exist, the different means by which such tags operate being too numerous to enumerate here. The application of the present invention may well allow such tags having code capacities of the order of 10 bits to be used in such applications as an industry-wide airline baggage sorting system routing up to $500 \times 10^6$ pieces of baggage per year, at the cost of some manual sorting. As distinct from the above, tags capable of longer code lengths such as acoustic delay tags described in the specification of U.S. Pat. No. 3,706,094 of the present applicant permit, for airline baggage sorting either of the two forms of the serial number system to be used, as determined by the optimum trade-off between cost and other system operational features. In applications where the number of articles to be sorted exceeds the range of $500 \times 10^6$ pieces per year, even acoustic delay line tags do not offer sufficient code capacity at a sufficiently low cost to make the first form of the serial number system feasible, and in such cases the second form becomes mandatory. Examples of such very large numbers of articles to be sorted arise in postal article sorting systems, for example the U.S. Post Office can be expected to handle approximately $6000 \times 10^6$ non-letter items or parcels per year.

The invention thus consists in a method and apparatus for article sorting wherein an electronically interrogatable label is provided for and attached to each article, the label bearing indicia indicative of a serial number, instructions relating to the routing of the label bearing those indicia being fed into a suitable computing system arranged to control the operation of sorting devices on receipt of a signal from means arranged to interrogate the label. The term "label" is intended to include any device such as, for example, a tag, capable of carrying the necessary indicia and of being attached to an article to be sorted.

In the application of the invention in a system in which articles bearing a label having indicia indicative of the same serial number may be submitted to said sorting devices during a predetermined period means are provided to separate out such articles for further manual sorting.

Figure 2:
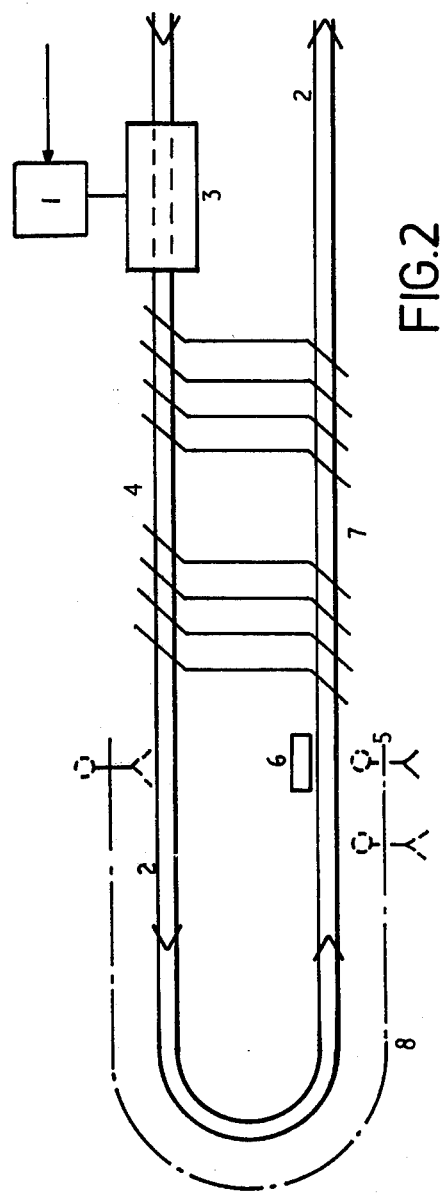

In order that the invention may be better understood and put into practice preferred forms of the invention are hereinafter described, by way of example, with reference to the accompanying drawings in which:

FIG. 1 is a diagram illustrating the application of the Unisearch system for handling airline baggage and FIG. 2 is a diagram illustrating the application of the invention to the sorting of postal parcels.

In the form of the invention illustrated in FIG. 1 the serial number concept is implemented by allocating every station in the Unisearch group its own set of tag serial numbers. These numbers are then continuously recycled. Sufficient numbers are allocated to give a mean turn-around-time of 14 days based on the estimated traffic density at that particular station. For example, a station enplaning $5.0 \times 10^6$ bags per annum could be allocated serial numbers 1 to $(1 - 0.3) \times 5.0 \times 10^6/26 = 134,000$ (assuming that 30 percent of enplaning bags are transfer bags which have been ticketed previously). Since no bag is likely to be in continuous transit for greater than 14 days, no two bags can ever carry the same serial number simultaneously. Thus every bag is uniquely identifiable. If station traffic has been under-or over-estimated, then the tags are merely cycled through the allocated tag-set somewhat more rapidly or more slowly respectively than the assumed 14-day cycle. In either case no problems are caused unless traffic has been so badly under-estimated that the 14-day cycle reduces almost to zero.

In 1969 all ATC/IATA airlines carried $264.6 \times 10^6$ passengers each having an average 1.3 checked bags per passenger. Assuming a passenger growth rate of 5 percent per annum, an estimated $419 \times 10^6$ baggage labels will be required during 1973, thus requiring $(1 - 0.3) \times 419 \times 10^6/26 = 11.3 \times 10^6$ different serial numbers. The industry-wide Unisearch tag is a 30-bit tag of which 27 bits may be freely assigned to give $2^{27} = 134.3 \times 10^6$ different possible codes. Thus sufficient code capacity is available for all conceivable future expansion.

ISSUING OF BAGGAGE TAGS

In the industry-wide Unisearch system all baggage tags must necessarily be dispensed from automatic Tag Issuing Machines (TIM's) in communication with the computing system.

OPERATION OF THE TIM's

Issue of a tag is begun by entering the bag routing data into the TIM via a conventional keyboard. The data must include the airline, destination and flight number of all flights to be taken by the bag. The data is displayed for verification on a CRT screen. If correct, the operator requests a transfer to the computing system. The TIM automatically reads the tag serial number, then causes a hardware interrupt to the computer. The TIM prints and issues the tag only after transfer is complete and the entered data accepted as correct by the computer. The printed data provides for manual sorting in the event of tag damage or of failure of the automatic sorting equipment (it may be observed that since this printed information will be seldom read, smaller printing may be used than otherwise possible, thus simplifying the design of the imprinting mechanism). For operator convenience the TIM may store and display preset routing information for selected common or current direct-destination flights enabling these tags to be issued by a single key-entry. In this form the TIM can also be used for self ticketing by experienced passengers.

REFILLING OF TIM's

All TIM's when full hold two separate rolls of 1024 Unisearch tags. A signal is produced by the TIM when the first roll is exhausted, thus providing a warning before the TIM becomes empty that a new roll of tags should be added to the machine. The bag processing rate through a combined ticketing-bag check-in position is approximately 24.4 bags per hour using present methods. For a TIM servicing 2 such positions, a new roll of tags must hence be required every 21 hours. At baggage-only check-in positions, check-in time per bag could be expected to reduce to perhaps 24 seconds per bag in peak periods. If this rate were continuously maintained, a TIM servicing two such positions would now require a new roll to be added every 3.4 hours. New rolls for all TIM's at any one station are dispensed from a single Bulk Dispensing Machine (BDM) also under computer control. The BDM contains two or more tag sets of the full range of serial numbers (for example, two or more sets of tags of serial numbers 1 to 132,072 in the present example) corresponding to three, six or twelve months tag supply as thought appropriate for inventory purposes. At any point of time, the BDM (based on information from the computer) dispenses that roll of tags whose serial numbers were used earliest in the previous cycle, thus giving the maximum possible time between re-issue of the same serial number. All tags in the tag set (e.g. all tags 1 to 132,072 in the present example) are eventually issued in turn.

The nature of the tags used and the system for interrogating them may be any of the presently known types, for example active or passive electronic tags of various kinds or optically read tags using bar codes or luminous inks, but are preferably of that described in the specification of U.S. Pat. No. 3,706,094.

OUTLINE OF SYSTEM OPERATION

A simplified block diagram of an industry-wide sorting station is shown in FIG. 1. The diagram illustrates both manned and various unmanned check-in positions. Except for transfer bags passed into the enplaning bag stream, enplaning and deplaning bags are mechanically handled by separate systems each system including conveyors, sensing tunnel, interrogate unit and sorting gates.

ENPLANING BAGGAGE

In the system shown in the diagram, originating baggage is tagged at manned check-in positions, manned baggage-only check-in positions, unmanned passenger self-check-in positions, remote unmanned passenger self-check-in positions. The one after may, for example, be located outside the terminal building either at curb side or in the parking lot. Baggage tags are issued by special Ticket-Issuing Machines (TIM's), each TIM servicing two baggage handling "positions," one on each side of the machine. It has been indicated that the average rate of baggage check-in per passenger is 24.4 per hour at normal manned check-in positions.

After check-in, baggage is transported to the bag room by as many conveyor belts, moving modules from remote points, or other means, as desired. The different baggage streams are there merged onto a single conveyor belt 1. Each bag is spaced not less than 4 ft. centre-to-centre by a mechanical spacing unit 2 and then passed through a single sensing tunnel 3. The use of a single sensing apparatus produces the maximum economy for this part of the system, while giving a peak sorting capacity in excess of that required for even a 5M bag per annum station. However, the capital cost of the sensing apparatus is low. The use of two or more sets of sensing apparatus operating under control the same central computer is feasible and may be desirable to effect savings in the mechanical handling equipment through improved bag room layout.

In an industry-wide Unisearch system each bag is tagged with a serial number acting as a pointer to routing information for the bag maintained in a central computer memory. After reading of the tag serial number within sensing tunnel 3, computer 30 is referenced to determine the mechanical sorting action to be performed. A short length of conveyor 4 provides adequate time for a reply to be received before this sorting action is initiated. As required, bags are diverted by diverter gates of conventional construction to any one of a set of spur lines 7 leading to bins or skid-plates (not shown) for loading onto containers for the various flights. Typically 10 to 20 spur lines may be provided, essentially no limit is imposed by the Unisearch system. Bags to be held in temporary storage for later flights pass to, for example, a helical type bulk storage unit 8. This unit is also run under control of the central computer to eject automatically groups of bags onto conveyor belt 10 for resorting by the system as their flight time approaches. Bags for which a serial number cannot be read because the bag carries either a damaged tag or no tag at all are diverted along conveyor belt 5 for manual sorting at a manual sorting position 9. One possible procedure is for operator 9 to enter the bag routing information into computer 30 via a keyboard. The bag is then passed back into the main bag stream and sorted by the normal system of diverter gates 7, its position on the conveyor system being computed from readings from photo-electric counters counting the number of bags passing on both the main conveyor line 1 and branch lines 6 and 10. Branch lines 6 and 10 return to the input side of the mechanical spacing unit 2 so that only one such unit is required.

DEPLANING BAGS

Operation for deplaning bags is analogous to that for enplaning bags just discussed. Deplaning bags from baggage truck or container unloading areas are funnelled through the system along the single conveyor belt 11. Each bag is spaced at not less than 4 ft. intervals by mechanical spacing unit 12 and the tag serial number read during passage through sensing tunnel 13. Computer 30 is referenced to determine the bag routing information and hence the mechanical sorting action to be performed by diverter spurs 17 leading to, for example, carousels in the claim-check area. A short length of conveyor 14 provides time for a reply to be received before this sorting action is initiated.

Bags carrying either a damaged tag or no tag at all are diverted along conveyor belt 16 for manual sorting at manual sorting station 9. As for enplaning bags, one possible procedure is for operator 9 to enter the bag routing information by keyboard into computer 30 and the bag is then returned to the main bag stream. Thereafter progress of the bag is continuously followed by counting the number of bags passing selected points along the conveyor system.

Transfer bags are passed to an inter-station conveyor belt or moving module system 18 and from there pass into the enplaning bag stream at either the same station or at other stations within the airport. Having entered the appropriate enplaning bag stream, transfer bags are sorted as for normal originating enplaning bags. The operation of the computer system 30 in the case of transfer bags is discussed further below.

THE SENSING TUNNEL AND INTERROGATE UNIT

Referring to FIG. 1, each interrogate unit operates under the immediate control of its own internal interrogte status logic unit and is capable of sorting bags at a conveyor belt speed of 6 ft. per sec. and bag separation 4 ft. giving a maximum bag sorting rate of 5,400 bags per hour. All interrogate units are controlled directly by central computer 30. On completion of each interrogation cycle, the interrogate unit holds in internal storage registers a set of 30 analog outputs proportional to the strength of the reply in each of the time window positions. The interrogate unit signals the above state by initiating a hardware interrupt or "sorting Inquiry" to computer 30. Computer 30 services the interrupt by instructing the interrogate unit to successively sample, digitise and return to the computer as a 16-bit binary word, each of the 30 stored analog outputs in turn. The computer then analyses the 30 16-bit words received to determine the tag serial number.

THE COMPUTING SYSTEM

The computing system provides in essence a file structure by which routing information for all bags can be accessed via the bag serial number as record key.

The operating of the computing system can perhaps be best understood from a description of the four principal jobs performed. These are:

INPUT OF DATA FOR ENPLANING BAGS

Referring to FIG. 1 the computing system 30 receives data on all bags to be enplaned either from connected Tag Issuing Machines (TIM's) or, in the case of bags deplaned at the station from arriving flights, via Flight Manifest Input device 31. Interconnecting data paths are shown as dotted lines in the diagram. The data or record for each bag includes the bag serial number plus routing information fields for all destination and transfer points. A maximum of 8 such routing information fields may be entered. Each field consists of 3 alpha characters specifying the airline, 3 alpha characters specifying the destination and 4 decimal digits specifying the flight number. The system enters the serial number plus the first routing field into a sequential Enplaning Flight Manifest File (EFMF) based on the flight and destination point (as specified by the first routing field) for which the bag is to be next enplaned. EFMF's are maintained for all flights and destination points for which baggage is currently being accepted. On flight closure, each EFMF is transmitted to its destination point either by current airline communication facilities, or as a tape record physically transported on board the aircraft.

SORTING OF ENPLANING BAGS

Passage of a bag through enplaning bag sensing tunnel 3 initiates a hardware interrupt or Enplaning Sorting Inquiry (ESI) to computer 30. The computing system analyses the tag response, and if the latter is of acceptable quality, extracts the tag serial number. The ESNF is then referenced using the serial number as record key to recover the first destination routing information for the bag. Using this information in a table look-up procedure, diverter-gate control signals are generated for correct sorting of the bag. If an acceptable response is not obtained, the bag is automatically diverted for manual sorting.

INPUT OF DATA FOR DEPLANING BAGS

The source of the necessary serial number and routing information for all deplaning bags are the EFMF's transmitted along with the bags from their originating airport as discussed above. Upon receipt of an EFMF at its destination point, the EFMF is merged into Deplaning Serial Number File (DSNF) again using the serial number as record key. For bags terminating at the station, no further action is taken. In the case of transfer bags, however, the bag serial number plus the first and subsequent routing fields of the EFMF records are assembled as a "new" enplaning transaction entry and entered into the DSNF and relevant EFMF for the station to which the bag is to be transferred. Note that each EFMF must be received at its destination point and processed as above before a deplaned bag covered by the EFMF can be sorted as described below.

SORTING OF DEPLANING BAGS

Sorting of deplaning bgs takes place by reference to the DSNF. The procedure is analogous to that for enplaning bags described above. Referring to the diagram, bags terminating at the station are sorted through diverter gates 17 to their respective claim-check areas or carousels. Bags transferring to other flights are passed via interstation conveyor system 18 into the enplaning bag stream of the station servicing the flight converned. Thereafter the bag is sorted in the standard way by reference to its DSNF and EFMF records previously entered.

A second form of the invention is implemented by using machine-readable tags or 16-bit code capacity, preferably, but not necessarily limited to, machine-readable tags of the surface acoustic wave delay type referred to above. Each Post Office in the postal system is allocated a complete set of these 16 bit tags, having serial numbers from 0 to $(2^{16} - 1) = 65,535$. Small Post Offices may be allocated a subset of the above complete set of tags. The tags preferably have the form of approximately 5 in. by 3 in. thin cardboard labels having adhesive on one side. A tag is struck to the side of each parcel received at the Post Office. The address information for each parcel is read and entered onto a suitable data storage medium via a keyboard, where it is associated with the serial number of the machine-readable tag adhered to the parcel. In certain cases it may be possible to have customers enter the parcel address data at entry terminals as part of the normal procedure for posting a parcel.

The steps described above may be associated with the stamping of the parcel. On receipt of a parcel the postal clerk will place it on a weighing machine linked with a computer, the clerk simultaneously enters the address information, for which, the postcode will, in many cases, be sufficient, but which may be suplemented with the street name, into the computer store by means of a keyboard whereupon the postage cost is displayed and a tag issued. The tag acts also as a postage stamp and after payment by the sender is adhered to the parcel. The parcel is then placed by the clerk in a bag or placed on a conveyor for transport to a bag.

After posting, parcels are sent in "parcel bags" from each local Post Office to the fist mail exchange or sorting point in the postal distribution system. The address information plus the associated serial number date for each parcel in a parcel bag is written onto a reusable magnetic data card and is physically attached to the parcel bag at the originating local Post Office. The magnetic data card thus physically accompanying the parcel bag when sent to the sorting point and no telephonic data transmission is required.

On reaching the first sorting point, the parcels in each parcel bag are automatically sorted according to the information on its accompanying magnetic data card. It is clear that the parcels in any one parcel bag reaching its first sorting point will be unambiguously coded. Since tags having serial numbers from 0 to 65,535 are issued in order, all that is required, at even the largest local Post Office handling more than 65,536 parcels per day, is that the parcels be placed into their particular parcel bags in the approximate order in which the parcels were received by the Post Office.

The operation of the system at sorting points after the first sorting point for any bag is somewhat different and requires special discussion. In this second form of the serial number system proposed for airline baggage all Post Offices continually re-issue tags having the same set of serial numbers 0 to 65,535. Since no attempt is made to regulate the time at which any local Post Office may issue a tag having a particular serial number, more than one local Post Office may issue the same serial numbered tag at the same time. Thus when parcels from different parcel bags, originating at different Post Offices are binned together after their first sorting, and are then placed in a further parcel bag with accompanying magnetic data card for despatch to the next sorting point in the postal distribution system, this further parcel bag will sometimes contain parcels having the same serial number. A similar situation arises for different parcel bags originating at the same local Post Offices but originating at different times. The essential point is that the above chance coincidence or tags having the same serial number in the same parcel bag will be known at the time it is produced, and a record of its occurrence will be maintained on the magnetic data card accompanying the further parcel bag in the normal way. Thus at the next sorting of the parcels in this further parcel bag, by having the sorting process controller first read through the complete accompanying magnetic data card, the existence if any of parcels bearing tags of coincident serial numbers can be noted, and such ambiguously coded parcels passed to an operator for manual sorting. The sorting process controller referred to above is an electronic equipment performing amongst other tasks the small amount of data processing required for this determination of coincident serial numbers.

If each parcel bag contains an average $2^8 = 256$ parcels, the probability of any two parcels in the same parcel bag having the same serial number is $2^8/2^{16} = 1$ in 256. This probability will apply for all sortings of the parcels of a parcel bag after the first sorting. For the first sorting on arrival from the originating local Post Office, this probability is zero as previously discussed. Thus at worst it is only necessary to manually sort 1 in every 256 parcels.

From time to time a parcel bag will by chance contain more than a single pair of ambiguously coded parcels, or will even contain a group of three or more parcels having the same serial number. The probability of the occurrence of such events however is so small that it will have a negligible effect on the above average of 1 in every 256 parcels requiring manual sorting.

By displaying the alternative addresses for ambiguously coded parcels on a CRT screen or other suitable display medium, the operation during manual sorting is required only to mark a simple choice between alternatives by pressing a single button. The address information of the parcel need never be re-encoded after the original encoding of the address at the originating post office or alternatively on the arrival of the parcel at its first sorting point prior to any sorting action.

There is little economic advantage to be gained from attempts to reduce the fraction of parcels requiring manual sorting below the figure of 1 in every 256 parcels given above. Indeed no automatic equipment will ever sort all parcels without error, even if this error only arises due to a physically damaged or removed tag. At least one operator must therefore be in attendance, and nothing is lost if this operator also performs a constant but reasonable work load.

A basic sorting equipment is shown in block diagram form in FIG. 2. FIG. 2 shows by way of example those items of equipment required if surface acoustic wave tags are used of the type referred to above. The serial number system in both its first and second forms is not of course limited to such tags but as discussed is generally applicable to coded tags of other kinds.

Prior to the sorting of the parcels in a parcel bag, the magnetic data card accompanying the parcel bag is read by a magnetic data card reader forming part of the sorting Process Controller 1. The parcels are then loaded on conveyor belt 2 by a suitable loading equipment and passed one at a time through Sorting Tunnel 3. During this passage through Sorting Tunnel 3, the parcel bag serial number is read remotely and the serial number as read is passed to Sorting Process Controller 1. Sorting Process Controller 1 then issues the necessary commands to a set of diverter gates 4 to perform the required sorting action for the parcel concerned as found by examining the address information previously read from the accompanying magnetic data card using the parcel serial number as reference pointer. If that serial number is identified by Sorting Process Controller 3 as being a serial number carried by more than one parcel of the parcels contained in the parcel bags being sorted, all parcels having that serial number are automatically passed to operator 5 for manual sorting. All possible addresses corresponding to the serial number in question are displayed on display device 6, and operator 5 by examination of the parcel indicates the correct choice by pressing an appropriate button. This information is passed back to the Sorting Process Controller 1 which initiates the required action by a further set of diverter gates 7 for correct binning of the parcel.

All parcels, for which by reason of tag malfunction or physical damage to the tag serial number cannot be read in passage through Sorting Tunnel 3, are also passed to operator 5. Here operator 5 must re-enter the postcode or alternatively directly specify the sorting action to be performed by diverter gates 7. In the implementation phase of the system not all Post Offices need necessarily be part of the system. As can be seen from FIG. 2 the sorting equipment there is capable of sorting any mix of tagged or untagged parcels. Untagged parcels are simply passed for manual sorting. During initial implementation when the number of untagged parcels will be large, additional operators 8 may be employed to supplement operator 5. The percentage of parcels requiring manual sorting will continuously decrease to approach the limit of 1 in every 256 parcels as the system is extended to an increasing number of Post Offices.

Finally the following points may be mentioned:

1. The particular choice of 16-bit tags and parcel bags containing an average 256 parcels are representative only. A final choice requires detailed study of costs in the particular application; for example it may be cheaper to use 12-bit tags in conjunction with parcel bags containing an average 64 parcels and to accept manual sorting of 1 in every 64 parcels.

2. Encoding of magnetic card data can be done either locally at the originating Post Office or centrally as required. It may even be possible to have customers enter their own address information before submitting their parcel for posting. As stated no subsequent re-encoding of this address information is every necessary no matter how many levels of sorting are employed. Apart from the encoding equipment required, equipment at each Post Office is minimal since tags can be dispensed manually if desired. Local encoding may improve industrial relations at central sorting points since fewer staff are required. Again, a final choice depends on complicated questions of cost, customer goodwill, industrial relations etc.

We claim:

1. Apparatus for sorting articles such as airline baggage comprising at least one ticket issuing machine (TIM) containing a predetermined plurality of interrogatable labels each bearing indicia indicative of a serial number taken from a closed and limited set of serial numbers, means in each said TIM for issuing said labels in consecutive order, label interrogation means responsive to said serial numbers on said labels, baggage sorting means constructed and arranged to direct each article of baggage being sorted along a desired one of a plurality of alternate routes, conveyor means arranged to carry articles of baggage from each said TIM past the label interrogation means to the baggage sorting means, said articles passing through said baggage sorting and conveyor means without additional machine readable sorting information therewith, said articles being transported on said conveyor means between said TIM and said sorting means a computing system linked with each said TIM, with said label interrogation means and with said article sorting means, means for entering routing instructions into the computer in relation to each serial number, said serial number related instructions being entered into the computing system when the TIM issues an interrogatable label to an article of baggage, the computing system being programmed to actuate said sorting means in accordance with a serial number on receipt of a signal from said interrogating means indicating the presence in said interrogating means of an article of baggage carrying a label bearing indicia indicative of that serial number.

2. Apparatus as claimed in claim 1 wherein baggage spacing means is provided adjacent said conveyor to space baggage thereon at not less than a predetermined spacing distance prior to passage of the baggage past the label interrogation means.

3. Apparatus as claimed in claim 1 wherein diverter means are provided adjacent said conveyor means to divert automatically an article of baggage carrying a label of improper condition, which condition includes at least one of the following conditions, having damaged label, having no label and having a label carrying a serial number which is known to be duplicated within the group of articles being sorted, interrogation means for sending a signal to the computing system on the passage of such an article, the computing system being programmed to cause operation of said diverter means on receipt of such a signal, and a branch line of said conveyor to convey an article thus diverted to a station for manual sorting.

4. Apparatus as claimed in claim 1 including a bulk storage unit, means under the control of said computing system to transfer baggage to and from said conveyor means and from and to said bulk storage unit.

5. A method of article sorting comprising the steps of attaching at a first physical location a machine readable interrogatable label to each article to be sorted, the label bearing indicia indicative of a serial number, said serial number being selected from a closed and limited set of serial numbers, feeding information relating to the sorting of each article to a first computing means at the time the label is allocated, said information being correlated with the serial number of the article, randomly loading a group of articles on a transport means, physically transporting a group of said articles with their attached machine readable interrogatable labels in a container, and in association with each container, a data storage medium prepared by the first computing means listing the serial number and correlated sorting instructions of every article in the container, feeding, prior to the sorting operation, the data on said data storage medium into a second computing means at a second physical location at which the articles are to be sorted, the second computing means being programmed to recognize repeated serial numbers among said data, passing the articles one by one through a label interrogating means, feeding the serial number extracted by said interrogating means to said second computing means, programming said second computing means to control the operation of sorting devices upon receipt of said serial number so as to route for manual sorting any article whose serial number is recognized as repeated and to route any other article according to its serial number-correlated sorting information, and, thereafter, passing the articles to the sorting devices for sorting accordingly.

6. A method of article sorting as claimed in claim 5 wherein the articles are postal parcels.

7. A method of article sorting as claimed in claim 5 wherein the articles are airline baggage.

8. A method of article sorting as claimed in claim 5 wherein the articles are airline baggage and each machine - readable, interrogatable label bears sufficient bits of information and permit each article of baggage in an industrywide airline system to be allocated a unique serial number at any point of time within a predetermined time cycle.

9. A method of article sorting comprising the steps of allocating to each article to be sorted an interrogatable label, the label bearing indicia indicative of a serial number, said serial number being selected from a closed and limited set of serial numbers, feeding information relating to the sorting of each article to a computing system at the time the label is allocated, said information being correlated with the serial number of the article, randomly loading a group of articles on a transport means, physically transporting such articles together with allocated interrogatable label with no additional machine readable sorting information therewith in a group, passing articles one by one through label interrogating means, feeding the serial number elicited by said interrogating means to the computing system which has been supplied with sorting information correlated with the allocated serial numbers, programming said computing system to control the operation of sorting devices in accordance with said sorting instructions on receipt of the related serial number, and thereafter passing the articles to the sorting devices for sorting in accordance with the routing instructions for each article, wherein the computing system is programmed to cause said sorting means to route any articles having the same serial number, presented for sorting within a predetermined period, for manual sorting and wherein the articles are postal parcels, parcels to be sorted being bagged in a bag having associated with it a data storage medium containing the serial numbers of each parcel in the bag and the related routing instructions, the data on the data storage medium being fed into the computing system prior to the sorting operation, the computing system being programmed to recognize identical serial numbers among said data.

10. Apparatus for sorting articles such as postal parcels comprising conveyor means, a station on said conveyor means for receiving the contents of an incoming bag of parcels, each parcel of which bears an interrogatable label bearing indicia indicative of a serial number and bearing no additional machine readable sorting information, label interrogating means in the path of said conveyor means, said parcels being randomly arranged on said conveyor means and being moved along said conveyor means between said station and said label interrogating means, parcel sorting means constructed and arranged to sort parcels passing on said conveyor means from said label interrogating means, a computing system linked with said interrogating means and said sorting means, means for entering in said computing system the serial number associated with each parcel in the bag and corresponding address instructions, said serial number and address instruction being entered into the computing system at the time of issuance of an interrogatable label and prior to the entry of parcels from said incoming bag of parcels to said conveyor means, the computing system being programmed to actuate said parcel sorting means in accordance with address instructions associated with a serial number on receipt of a signal from said interrogating means indicating the presence in said interrogating means of a parcel carrying a label bearing indicia indicative of that serial number and to actuate said sorting means to leave any parcels associated with the same serial number on said conveyor means and a manual sorting station adjacent said conveyor means for manually sorting parcels passing said sorting means on the conveyor means.

11. A method of article sorting comprising the steps of allocating to each article to be sorted an interrogatable label, the label bearing indicia indicative of a serial number, said serial number being selected from a closed and limited set of serial numbers, feeding information relating to the sorting of each article to a computing system at the time the label is allocated, said information being correlated with the serial number of the article, physically transporting such articles together with allocated interrogatable label with no additional machine readable sorting information therewith in a group, passing articles one by one through label interrogating means, feeding the serial number elicited by said interrogating means to the computing system which has been supplied with sorting information correlated with the allocated serial numbers, programming said computing system to control the operation of sorting devices in accordance with said sorting instructions on receipt of the related serial number, and thereafter passing the articles to the sorting devices for sorting in accordance with the routing instructions for each article and wherein said computing system includes a first portion at a first physical location for receiving information relating to the sorting of each article and a second portion at a second physical location remote from said first physical location for receiving the serial number elicited by said interrogating means.

12. Apparatus for sorting articles such as postal parcels comprising conveyor means, a station on said conveyor means for receiving the contents of an incoming bag of parcels, each parcel of which bears an interrogatable label bearing indicia indicative of a serial number and bearing no additional machine readable sorting information, label interrogating means in the path of said conveyor means, said parcels being randomly arrnged on said conveyor means at said receiving system and being moved along said conveyor means between said station and said label interrogating means parcel sorting means constructed and arranged to sort parcels passing on said conveyor means from said label interrogating means, a computing system linked with said interrogating means and said sorting means, means for entering in said computing system the serial number associated with each parcel in the bag and corresponding address instructions, said serial number and address instruction being entered into the computing system prior to the entry of parcels from said incoming bag of parcels to said conveyor means, the computing system being programmed to actuate said parcels sorting means in accordance with address instructions associated with a serial number on receipt of a signal from said interrogating means indicating the presence in said interrogating means of a parcel carrying a label bearing indicia indicative of that serial number and to actuate said sorting means to leave any parcels associated with the same serial number on said conveyor means for manually sorting parcels passing said sorting means on said conveyor means and also including a preparing station for preparing tags for parcels for transport to said receiving station including means for issuing said interrogatable labels to said parcels, said computing system including a portion associated with said preparing station and a portion associated with said receiving station and means for entering serial number information into said transporting computing system portion at the time of issuance of said interrogatable labels.

* * * * *